United States Patent [19]

Staudacher et al.

[11] Patent Number: 5,414,859
[45] Date of Patent: May 9, 1995

[54] INTERPROCESSOR COMMUNICATION PROTOCOL WITH BUILT-IN ERROR PREVENTION ENCODING

[75] Inventors: Daniel W. Staudacher, Denton; Frank P. Mimick, Watauga, both of Tex.

[73] Assignee: Tandy Corporation, Fort Worth, Tex.

[21] Appl. No.: 106,215

[22] Filed: Aug. 13, 1993

Related U.S. Application Data

[63] Continuation of Ser. No. 889,657, May 27, 1992, abandoned.

[51] Int. Cl.$^6$ ............................................. G06F 11/08
[52] U.S. Cl. ...................................... 395/725; 395/575; 371/37.1
[58] Field of Search ............... 395/725, 325, 575, 275; 371/37.5, 12, 4, 33, 37.1

[56] References Cited

U.S. PATENT DOCUMENTS

| | | | |
|---|---|---|---|
| Re. 31,666 | 9/1984 | Doi et al. | 371/45 |
| 3,798,613 | 3/1974 | Edstrom et al. | 395/275 |
| 4,339,776 | 7/1982 | Langer et al. | 360/69 |
| 4,546,474 | 10/1985 | Sako et al. | 371/37.5 |
| 4,620,311 | 10/1986 | Immink | 375/19 |
| 4,695,908 | 9/1987 | Imakoshi et al. | 360/119 |
| 4,773,001 | 9/1988 | Blair et al. | 340/825.52 |
| 4,799,179 | 1/1989 | Masson et al. | 364/724.1 |
| 4,802,152 | 1/1989 | Markvoort et al. | 371/37.5 |
| 4,901,232 | 2/1990 | Harrington et al. | 395/275 |
| 4,972,484 | 11/1990 | Theile et al. | 395/2.36 |
| 5,325,372 | 6/1994 | Ish-Shalom | 371/37.6 |

OTHER PUBLICATIONS

DCC System Description vol. 1, Digital DCC Compact Cassette, published by Philips Consumer Electronics B.V., Mar. 1993.
Digital DCC Compact Cassette, published by Philips Consumer Electronics, Feb. 1991.

*Primary Examiner*—Jack B. Harvey
*Assistant Examiner*—Glenn A. Auve
*Attorney, Agent, or Firm*—Haynes and Boone

[57] ABSTRACT

A communications protocol for use in a main control processor used in an electronic product, which includes at least a second processor to control the user interface, such as a keyboard and a data display. The protocol gives the main control processor the ability to interpret commands received accurately and to disregard those commands that are erroneous. In addition, the protocol provides the user interface processor with all necessary feedback information it needs to determine its mode of operation or any possible error conditions that may have occurred. Furthermore, the protocol provides each processor the ability to utilize its own resources independently, while at the same time communicating with the coprocessor in a manner that treats the other processors as extended subsets of itself.

12 Claims, 11 Drawing Sheets

INTERPROCESSOR COMMUNICATION PROTOCOL WITH BUILT-IN ERROR PREVENTION ENCODING

CROSS REFERENCE TO RELATED APPLICATION

This application is a continuing application of U.S. patent application Ser. No. 07/889,657 (Attorney Docket No. 92-027-US), entitled DCC COMMUNICATIONS PROGRAM, filed on May 27, 1992, now abandoned, assigned to the assignee of the present application, and incorporated herein by reference as if reproduced in its entirety.

BACKGROUND OF THE INVENTION

The present invention relates generally to interprocessor communications protocols, and, more specifically, to an asynchronous RS232-compatible interprocessor communications protocol used between a master control processor and a slave processor for use in consumer electronic products.

Many consumer electronic products use a microprocessor chip to control the features and operation of the product. Such products include, for example, but are not limited to, audio and/or video cassette players and/or recorders, receivers, telephone answering devices, photocopying machines, television sets, compact disc players, and facsimile machines. Most of these products include a user interface comprised of a keyboard or pad and an information display to allow a user to select any of a number of desired operations possible and to view the status of the product at any particular moment. Typically, these products perform a multitude of functions or process a large amount of data. To handle all the functions and processing capabilities demanded of a product, sophisticated processors are required.

Ideally, a single control processor is used to control all the functions of the product; however, many products have a large number of input or output functions, or both, with many external interrupts with which to be interfaced. For example, a new upcoming digital cassette deck, better known as the digital compact cassette ("DCC") deck, has the ability digitally to record and play back audio information, as well as play back analog compact cassettes. To process the digital information, the control processor must handle over 1800 bytes of synchronous data, including auxiliary data, system information and digital signal processing status every second at a one megabits per second (Mbits/sec) baud rate. In addition, the DCC deck is required to service an American Electronics Society-European Broadcast Union (AES/EBU) standard bus with up to 96 bytes of "Q" subcode data and 2 bytes of "C" data from a digital source such as a CD player every 13 ms (the CO transmits the "Q" subcode data at a 75 Hz frame rate, while trying to sample and debounce at least 23 keys and scan the display simultaneously. Furthermore, the DCC deck uses a fluorescent indicator panel with 16×18 (288 total) segments, which panel further taxes the control processor's abilities.

Control processors capable of all of the above functions are very expensive, too expensive for all but the high-end consumer market. Accordingly, most consumer products, such as the DCC deck above, use multiple processors to perform all the desired functions. These processors include a control processor, which controls the functions of the deck and all other processors, an interface processor, which is used to control the function of the keyboard and display, and other processors for digital signal processing.

To communicate among processors, a communications protocol must be adopted that is efficient, accurate, and fast. One type of communications software made specifically for use with DCC decks is found in AR350 Deck Controller by Phillips, the original developer of the DCC technology. The protocol is a RS232 serial communications protocol used to control the AR350 cassette deck. The protocol follows UART standards, utilizing an eight-bit data, one start and one stop bit format, running at 9600 baud. Furthermore, there are eleven (11) basic control commands with one status byte, which is returned to the host processor. The status byte allows for only one of eight bits to be set at a time, reflecting its current mode of operation. Error correction is performed by sending each command at least three times. To over come the inherent delay of sending three commands, the system attempts to compensate by sending the commands at a higher baud rate than used by other protocols.

A second communications protocol is used in the LR3715M Remote Control Transmitter, manufactured by SHARP. The transmitter uses a Pulse Position Modulation ("PPM") scheme to transmit up to 56 different commands with a six-bit code embedded within a 15-bit data word. The protocol uses an error prevention encoding scheme that requires two 15-bit data words to be transmitted in succession, where the former contains the six-bit code word and the latter provides an inverted form of the six-bit code word. Therefore, the LR3715M system requires at least 30 bits of information to generate one command. Although the cost of semiconductor chips have dramatically fallen over the years, conventional memory and processor chips are still expensive, meaning using 30 bits of data to transmit but a single command is inefficient and expensive.

Accordingly, what is needed is a communications protocol for an electronic system using more than one processor to allow the processors to communicate with each other more efficiently, more accurately, and more quickly than presently available while requiring less effort, less storage space, and/or less demanding error protection means than presently required.

SUMMARY OF THE INVENTION

The present invention discloses a communications protocol for use in a main control processor used in an electronic product, which includes at least a second processor to control the user interface, such as a keyboard and a data display. The protocol gives the main control processor the ability to interpret commands received accurately and to disregard those commands that are erroneous. In addition, the protocol provides the user interface processor with all necessary feedback information it needs to determine its mode of operation or any possible error conditions that may have occurred. The protocol for most operations only requires two bytes of handshake data, the first byte including error code information so that the command is implemented correctly and the second byte returning status information used as an acknowledge with an indication of the mode that the control processor has implemented. Furthermore, the protocol provides each processor the ability to utilize its own resources independently, while at the same time communicating with the coprocessor in a manner that treats the other processors as extended subsets of itself.

DETAILED DESCRIPTION OF SPECIFIC EMBODIMENTS

Figure 1:
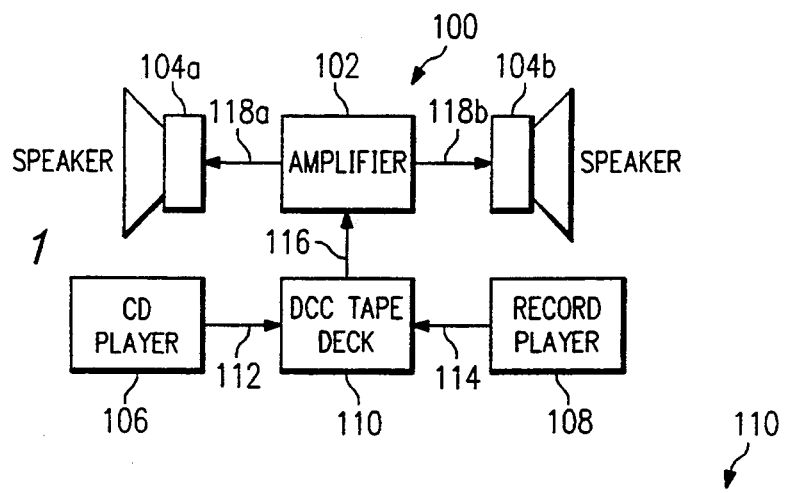
FIG. 1 is a functional block diagram of a high fidelity stereo system including a digital compact cassette deck incorporating features of the present invention.

In FIG. 1, the reference numeral 100 designates a high-fidelity stereo system embodying principles of the present invention. The system 100 includes a stereo amplifier 102, two speakers 104a, 104b, a compact disk (CD) player 106, a high-fidelity stereo record-player 108, and a digital compact cassette (DCC) deck 110. The deck 110 is utilized principally for the recording and playback of digital audio tape (not shown) configured in the DCC format, and may also be utilized for playback of standard, prerecorded analog cassette tapes. It is understood that multiple program track selections of music or other information may be played and/or recorded on the tape utilizing the deck 110. The deck 110 may also be used to implement an improved method of performing automatic search operations to locate and play the selections in any order desired by the user.

The CD player 106 and the record player 108 are included as part of the system 100 to represent typical examples of digital and analog input sources, respectively, to the deck 110. The CD player 106 and the record player 108 provide the deck 110 with digital and analog inputs on lines 112 and 114, respectively, for purposes of recording a DCC tape using the deck 110. A line 116 connects the output of the deck 110 to the amplifier 102 which amplifies the output signal from the deck 110 and transmits the amplified signal to the speakers 104a, 104b via lines 118a, 118b, respectively. It is understood that FIG. 1 has been simplified for illustration purposes and that, in general, additional connectors would be utilized for connecting the amplifier 102 to the CD player 106 and to the record player 108.

Figure 2:
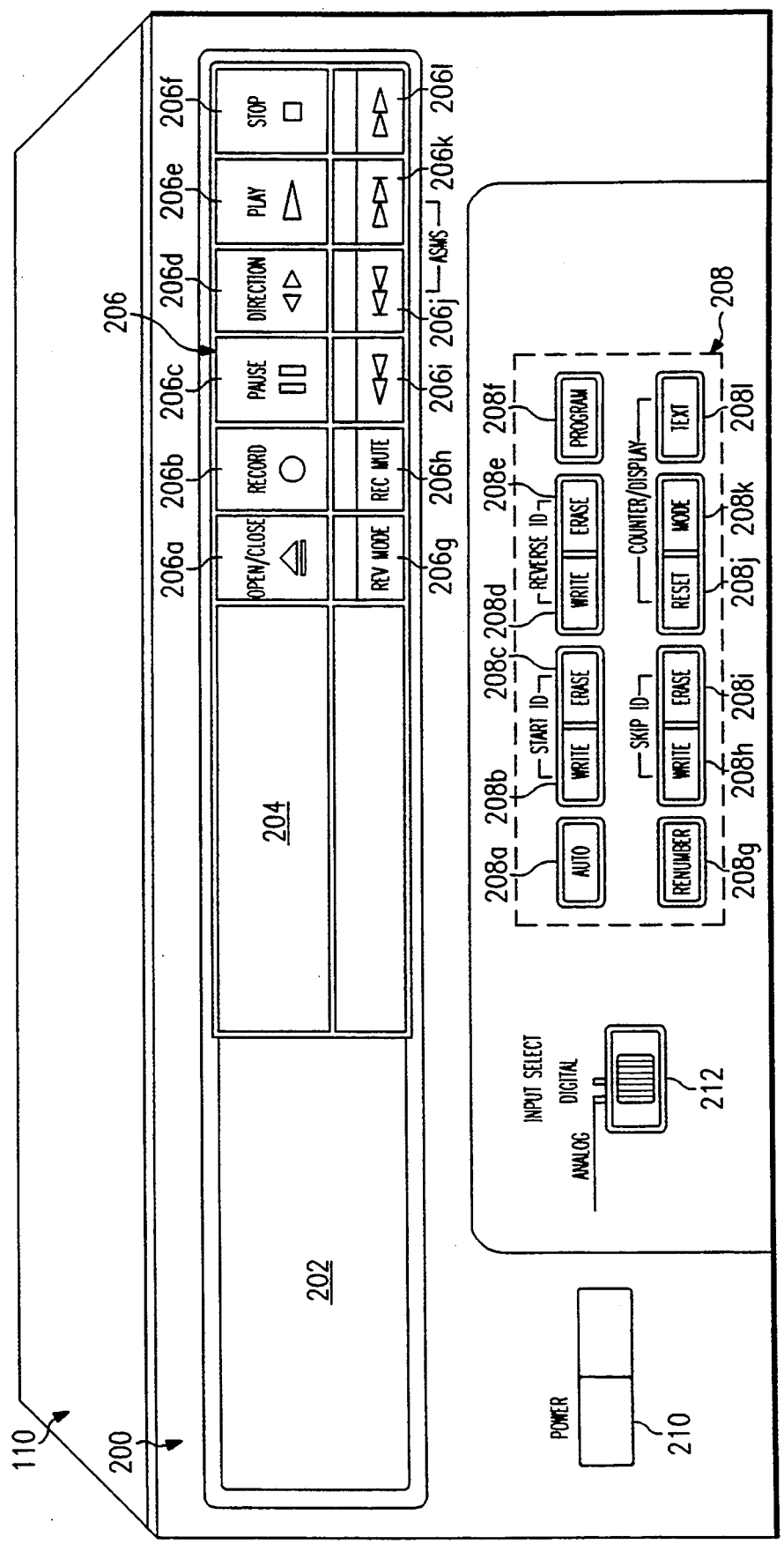
FIG. 2 is a perspective view of the front panel of the digital compact cassette deck of FIG. 1.

FIG. 2 illustrates the front panel 200 of the deck 110. The panel 200 includes a vacuum fluorescent display 202 for the display of icons and alphanumerics, a tape drawer 204 for the loading and unloading of both analog and DCC tapes, a system control panel 206 for user interface and control of system functions, an edit control panel 208 for user interface and control of DCC tape editing functions, a power switch 210 for turning the deck 110 on and off, and an input select switch 212 for selecting either the analog input from the record player 108, or the digital input from the compact disk player 106, to the deck 110.

The system control panel 206 includes an "open/close" switch 206a that controls the opening and closing of the tape drawer 204, a "record" switch 206b that places deck 110 in a record-pause mode, a "pause" switch 206c that places the deck in either a pause or an unpause mode, a "direction" switch 206d that controls the direction of motion of the tape during record and play-back modes of operation, a "stop" switch 206f to stop the operation of deck, and a "play" switch 206e to initiate the playing of a tape. The control panel 206 further includes a "reverse mode" switch 206g that sets-up the auto-reverse function of the deck 110 for automatic control of the playing of a tape, a "record mute" switch 206h for the recording of four seconds of silence, a "rewind" switch 206i for the rewinding of a tape, a "search reverse" switch 206j for automatic search to the beginning of the current or previous track, a "search forward" switch 206k for the automatic search to the beginning of the next track, and a "fast forward" switch 206l for fast forwarding of a tape.

It should be noted that once the record switch 206b has been pressed, placing the deck 110 in a record-pause mode, either the pause switch 206c or the play switch 206e must be subsequently pressed in order to place the deck in the record mode. The edit control panel 208 includes an "auto" switch 208a that takes the deck out of the default automatic mode of operation and activates the edit control panel or if selected again, place the unit back into AUTO mode, a "start ID write" switch 208b for placing a start marker on the tape to identify the start of a particular program track, an "start ID erase" switch 208c for the removal of a start marker, a "reverse ID" write switch 208d for placing a reverse marker on Sector A of the tape to identify the point on the tape at which the deck 110 should reverse direction of play to Sector B, a "reverse ID erase"60 switch 208e for removal of a reverse marker, and a "program" switch 208f for programming a desired sequential selection of tape tracks to be played. The panel 208 further includes a "renumber" switch 208g for the renumbering of program tracks, a "skip ID write" switch 208h for placing a skip marker on the tape to identify particular program tracks to be skipped over so that they will not to be played, a "skip ID erase" switch 208i for removal of a skip marker, a "reset" switch 208j for resetting the tape counter, a "mode" switch 208k for selecting the mode of the tape counter, such as track time, remaining track time, absolute time, total remaining time of the "type" of Text desired to be displayed after pressing the "TEXT" switch 208l of the tape, or the like to be displayed on the display 202, and a "text" switch 208l for selecting text mode, such as, track title, artist, credits, lyrics, or the like to be displayed on the display 202.

Figure 3:
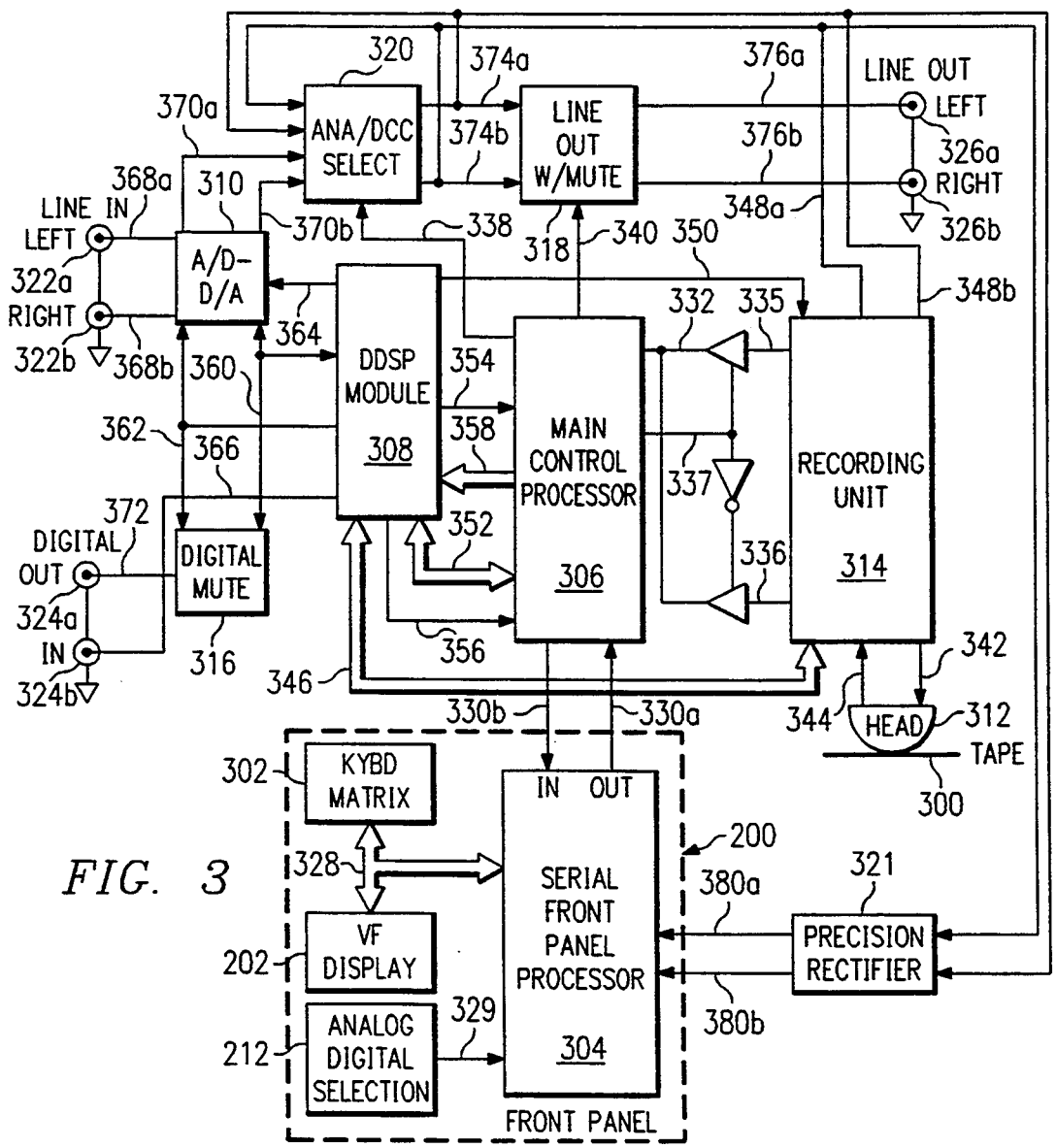
FIG. 3 is a functional block diagram of the digital compact cassette deck of FIG. 1; and, FIGS. 4a–4e comprise a flow chart illustrating in detail the main logic routine implemented by the control processor to implement the functionality of the cassette deck of FIG. 1.

FIG. 3 is a functional block diagram illustrating the various components of the deck 110. It is understood that the deck 110 is utilized for the recording, playback and editing of audio information, such as high fidelity stereo music or the like, on a DCC tape 300 received in the tape drawer 204 (FIG. 2). It is also understood that the tape 300 is either prerecorded or consumer-recorded using a DCC deck, such as the deck 110. The deck 110 is also able to receive and playback standard analog cassette tapes (not shown). The front panel 200 of the deck 110 includes the vacuum fluorescent display 202, a select switch 212, a keyboard matrix 302, and a front panel processor 304. The deck 110 further includes a main processor 306, a digital drive signal processor (DDSP) module 308, a analog-to-digital (A/D) and digital-to-analog (D/A) converter 310, a digital compact cassette record/play thin film head 312, a recording unit 314, including a tape drive mechanism and a read/write amplifier (not shown), a digital signal mute circuit 316, an analog signal mute circuit 318, an analog/DCC select circuit 320 and a precision rectifier 321. Two line input jacks 322a, 322b, a digital input jack 324b, a digital output jack 324a, and two line output jacks 326a, 326b are also provided, as discussed further below.

The keyboard matrix 302 includes the control panels 206 and 208 (FIG. 2) and provides an operator with a means to interface and interact with the deck 110. The front panel processor 304 is connected to the keyboard matrix 302 by a bus 328 that continuously strobes the keyboard matrix to determine when any of the switches 206a-206l or 208a-208l are pressed. Further, the processor 304 is connected to the display 202 by the bus 328 and controls the display of icons and alphanumeric information on the display and to the select switch 212 by a line 329 that is used to indicate the position of the switch 212. The processor 304 is connected to the main processor 306 by two serial bus lines 330a, 330b that are used for the transfer of information between the processors 304 and 306. The main processor 306 has direct control over all system operations and functions within the deck 110 and contains the instructions and implementation of the interprocessor communications program of the present invention, described in detail herein. The main processor 306 is connected to the recording unit 314 by a status line 332, and a data bus 334. The status line 332 is derived by multiplexing a status line 335 from the recording unit 314 and a feedback line 336 from the recording unit 314 by toggling a control output line ("TCMP") 337 every 10 ms, where the status line 335 is read on the positive half cycle of the TCMP 337 and the feedback line 336 is read on the negative half cycle of the TCMP 337. The status line 335 indicates to the control processor 306 the cassette status of the tape 300, which includes whether the tape 300 is a DCC or an analog cassette, whether the tape is record-prevented, and the time-length of the tape. The feedback line 336 indicates to the control processor 306 the tape status of the tape 300, which includes whether the tape 300 is moving, stopped or broken, the position of the head 312 (in, out, or in the search position), and whether the tape is transparent, thus indicating the end of the tape. A bus 336 is used by the main control processor 306 to control the functions of the recording unit 314. These functions include the speed and direction of movement of the tape 300, the position of the tape head 312 and the tension on the tape. A control line 338 connects the processor 306 to the select circuit 320 and enables the processor 306 to select an output source depending on whether the tape 300 is analog or digital. Similarly, a control line 340 connects the processor 306 to the mute circuit 318 and enables the processor to mute the analog output.

While not shown, it is understood that the recording unit 314 includes a capstan drive, a reel drive, a head position solenoid, a read amplifier and a write amplifier. The recording unit 314 is connected to the head 312 by a write line 342 and a read line 344, which are used for the writing and reading, respectively, of digital data, including audio data, system information, containing the copyright protection status and recording-related text, parity codes for error detection and correction, and auxiliary data from the tape 300. The read line 344 is also used in receiving an analog signal from the head 312 during playback of an analog tape (not shown). The recording unit 314 is connected to the DDSP module 308 by a plurality of buses designated with the reference numeral 346. The buses 346 include a serial clock bus and nine parallel data buses that are used for the synchronous transfer of data to and from the recording unit 314. The recording unit 314 is connected to the select circuit 320 by a left channel output line 348a and a right channel output line 348b that are used by the recording unit 314 during the playback of an analog tape (not shown) and to the DDSP module 308 by a speed control line 350 that is used during playback to control the speed of motion of the tape 300 and, consequently, the rate in which data is transferred to the DDSP module via the buses 346 precision rectifier 321 is connected to the outputs of the analog/DCC select switch at lines 374a and 374b.

The DDSP module 308 has direct control over the encoding, decoding, formatting and error correction of the data exchanged on the buses 346. While not shown, the module 308 includes five main components, which are a DDSP for the formatting and unformatting of data, an error correction device for error detection and correction, a sub-band codec device for the coding and decoding of sub-bands of the sampled audio data, a digital audio interface for interaction between the DDSP and the converter 310, and a digital equalizer to overcome the distortion made in the tape recording and playback processes. In the playback of the tape 300, digital data is transferred to the DDSP module 308 by the buses 346 and the DDSP module 308 unformats the data and corrects any correctable errors using a Reed-Solomon encryption code, well known in the art. The unformatted data is transferred to the main control processor 306 via a bidirectional bus 352. A determination is made from the auxiliary data as to how the tape 300 was recorded and, consequently, the processor 306 transfers the appropriate digital equalizer filter coefficients to the module 308. It is understood that the Digital Equalizer consists of multi-tapped filters used to optimize the digital signals received from the read amplifier attached to the thin-film head 312 which are well known in the art.

A synchronous start segment control line 354 connects the DDSP module 308 to the main processor 306 and indicates to the processor 306 when it is time to either transmit or receive data. An asynchronous label control line 356 also connects the module 308 to the processor 306 and indicates to the processor the occurrence of a label on the tape 300. A plurality of control lines 358 enable the processor 306 to select which of the aforementioned main components of the DDSP module 308 are to either receive or transmit data via the bus 352. The DDSP module 308 is connected to the converter 310 and to the mute circuit 316 by a serial data bus 360 and a control line 362 for the transfer of digital data and for muting the digital output from the deck 110, respectively. Further, the DDSP module 308 supplies a clock signal to the converter 310 via a line 364 for the clocking in and out of data via the serial bus 360, and receives digital data input from the jack 324b on a line 366 for subsequent PASC data compression.

The converter 310 is used to convert analog signals to digital signals and digital signals to analog signals. The converter 310 receives analog audio inputs for left channel and right channel from the jacks 322a, 322b via two lines 368a, 368b, respectively, and converts the signal to an 18-bit serial digital signal that is sent to the DDSP module 308 and to the mute circuit 316 on the serial bus 360. In addition, the converter 310 receives digital data that has undergone PASC data decompression via the serial data bus 360 and converts the data into left and right channel analog signals for output via two lines 370a, and 370b, respectively. Further, the analog output signal on the lines 370a, 370b can be inhibited or muted by the DDSP module 308 via a control signal on the line 362.

The digital mute circuit 316 is used by the deck 110 to mute the digital output from the jack 324a, as commanded by the DDSP module 306 via the control line 362. Typically, the circuit 316 receives serial data from the DDSP module 308 on the serial bus 360 and outputs same from the jack 324a via a line 372. The analog/DCC select circuit 320 enables the processor 306 to select either the inputs from the recording unit 314 on the lines 348a, 348b used during the playback of an analog tape or the input from the converter 310 on the line 370a, 370b used during the playback of the DCC tape 300 via the control line 338, and to output the left and right channels of the selected input to the mute circuit 318 on two lines 374a and 374b, respectively. Similarly, the mute circuit 318 is used by the deck 110 to mute the stereo output from the jacks 326a, 326b, as commanded by the processor 306 via the control line 340. Typically, the circuit 318 receives left and right channel inputs on lines 374a and 374b and outputs the same to the jacks 326a, 326b on two lines 376a, 376b, respectively. The precision rectifier 321 is connected to the analog right and left channel output lines 374a, 374b and is used to convert the alternating output signal to direct current with a known conversion efficiency. The rectified signal is input to the front panel processor 304 via two input lines 380a, 380b. The processor 304 uses the rectified signal to determine the beginning of a new program track predicated on the assumption that both left and right channels exceed −10 dB to arm the system and that the track is preceded by silence (−40 dB) for a period of 4 seconds, and to display a relative signal level via a dB-scaled bar graph.

It is understood that the output of the record player 108 is input on the line 114 to the deck 110 via the jacks 322a, 322b and the CD player 106 is input on the line 112 to the deck via the jack 324b. Similarly, the output of the deck 110 is input on the line 116 to the amplifier 102 via the jacks 326a, 326b.

Normally, the two processors 304 and 306 communicate with each other and with the rest of the components in deck 110 during operation. To communicate with each other, the processors use the interprocessor communications format or protocol described and illustrated below. The command structure uses a ten-bit (10) code, which has one start bit, eight (8) data bits (D0–D7), or one (1) byte, and one (1) stop bit, transmitted at 4800 baud, or one bit per 208.3 microseconds (1/4800).

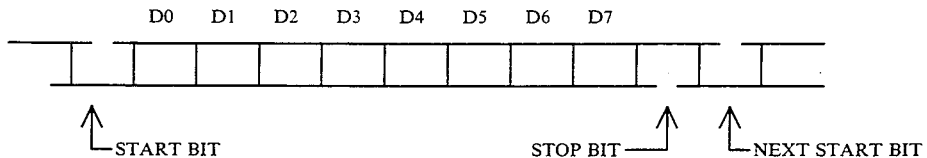

The protocol uses an asynchronous NRZ format, with the least-significant bit transmitted and received first.

The interface processor 304 can issue a group of single byte commands. The commands are designed to incorporate an "Error Prevention Encoding scheme," where each command includes both a nibble (four (4) bits) of actual command information and the inverse of the nibble command. For example, the command byte format is as follows:

| D7 | D6 | D5 | D4 | D3 | D2 | D1 | D0 |
|----|----|----|----|----|----|----|----|
| /C3 | /C2 | /C1 | /C0 | C3 | C2 | C1 | C0 |

The upper nibble of the data byte is the "check nibble," of which will be the inverse of the lower "command nibble." Control processor 306 receives the command byte and then checks it for validity by performing an exclusive-OR operation on the check nibble with the compliment of the command nibble. If the result is not zero, then an invalid command byte has been received by control processor 306. If a valid command has been received, control processor 306 issues a status byte to user interface processor 304. Interface processor 304 then checks the status byte to insure that control processor 306 is performing the desired operation. The following is a list of commands than can be issued by the user interface processor 304 only:

| Commands | Check nibble | Command nibble | Byte |
|----------|--------------|----------------|------|
| FRONT PANEL PROCESSOR COMMANDS: | | | |
| STOP/ABORT | 1111 | 0000 | F0 |
| PLAY | 1110 | 0001 | E1 |
| REVERSE | 1101 | 0010 | D2 |
| FFWD | 1100 | 0011 | C3 |
| REWIND | 1011 | 0100 | B4 |
| SEND TEXT | 1010 | 0101 | A5 |
| DL_TOGGLE | 1001 | 0110 | 96 |
| RECORD | 1000 | 0111 | 87 |
| SYSTEM INFO | 0111 | 1000 | 78 |
| PAUSE | 0110 | 1001 | 69 |
| ACK | 0101 | 1010 | 5A |
| REPEATMODE | 0100 | 1011 | 4B |
| ID-OPERATIONS | 0011 | 1100 | 3C |
| TIME_INFO | 0010 | 1101 | 2D |
| ASMS_NEXT | 0001 | 1110 | 1E |
| ASMS_PREV | 0000 | 1111 | 0F |
| EXCEPTIONS TO THE RULE: | | | |
| RESET | 1110 | 1110 | EE |
| FrontPnl Sync | 1010 | 1010 | AA |
| ControlPr Sync | 0101 | 0101 | 55 |
| RE_TRANSMIT | 0000 | 1001 | 09 |

During operation, each processor in deck 110 expects periodic responses from the other processor. If a command is sent by the user interface processor 304, control processor 306 will process the command, upon which it will return either a "current status" byte or a no-acknowledge ("NAK") byte. If the interface processor 304 receives a NAK response, it will process the NAK, which may result in the command being reissued, if necessary. Processor 304 may retransmit the command byte a sufficient number of times, such as eight (8) or more times, until either a successfully received current status command results or a failure is indicated, at which point the operation is aborted.

From time to time, the operation of the deck must be stopped due to a problem or completed operation, such as, for example, reaching the end of the tape. When a problem or completed operation is detected by the system, the user interface processor 304 will acknowledge the situation and respond accordingly, based upon the current status of control processor 306. If a more serious problem, for example, an overrun error, persists, the interface processor 304 may issue a "FrontPnl Fync" command to clear any errors or message requests pending. If this fails, either the interface processor 304 or control processor 306 may perform a hardware "reset" to both processors, which provides detrimental or even fatal error recovery of the system in use.

FIGS. 4a–4e illustrate flowcharts of the processor interaction between the control processor 306, the user interface processor 304, and/or other specific processors (not shown) used during the operation of the DCC deck 110. For preliminary information, at the beginning of the main routine (MAIN), several interrupt routines are represented. Importantly, these interrupts may interrupt the flow of the main routine of the control processor 306 at any time during the operation of the deck 110. Once the routine is completed, the control processor 306 returns to the main routine for further operation. In step 402, the control processor 306 determines if a timer interrupt ("tmrint") request has been issued, which interrupt is performed every 10 milliseconds (ms). The full procedure of the tmrint is illustrated in FIGS. 5a–5c and described in greater detail below. If a tmrint request has been issued, the interrupt is executed in step 404, which includes updating the cassette final status and the tape final status which are explained below. Afterwards, the interrupt returns the control processor to the main program.

The next interrupt (step 406) is an external interrupt to the control processor from an Opto-sensor ("Opto-Sense"). If an Opto-Sense interrupt is determined in step 408, the external interrupt is performed, which clears a "sensecnt" variable. Afterwards, the interrupt returns the control processor 306 to the main program.

The next interrupt request is shown in step 412. This step involves an external interrupt on the start segment control line 354 (FIG. 3) from the digital drive signal processing (DDSP) module 308, to a timer capture input of the control processor. If this interrupt is requested in step 414, the interrupt is executed to set a "STARTSEG" flag (step 416). Once this is completed, the interrupt returns the system to the main routine.

The last interrupt routine shown in step 418 and is illustrated more fully in FIG. 6 and described below. This interrupt is the asynchronous serial communication interface ("SCI") routine, which receives any commands transmitted by interface processor 304, also described in FIG. 6.

The main routine begins with step 424 as the control processor checks to determine if the deck is in a "play" mode. If the deck 110 is not in a play mode, the control processor 306 proceeds to step 438, which is described below. If the deck 110 is in play mode, the control processor 306 proceeds to step 426 to determine if the cassette tape being played is a DCC cassette tape. If the cassette tape is not a DCC tape, the control processor 306 proceeds to step 438. If the cassette tape is a DCC tape, the control processor 306, in step 428, determines if the tape is a commercially prerecorded tape. If the tape is not a prerecorded tape, the control processor 306 proceeds to step 438. If the tape is a prerecorded tape, the control processor 306, in step 430, clears the user mode ("USERMD") variable, which enables the table of contents ("TOC") on the tape to be checked. Next, the control processor 306, in step 432, determines if the TOC is available. If yes, the control processor 306 proceeds to step 438. If not, the control processor 306, in step 436, reads the TOC and stores the track number information from the TOC in a "Total # of Tracks" variable.

In step 438, the control processor 306 checks the cassette by determining if a cassette final ("CAS_FNL") variable is equal to a cassette type ("CAS_TYP") variable. If the two variables are equal, the control processor 306 proceeds to step 450. If the two variables are not equal, the control processor 306, in step 440, saves the contents of the CAS_FNL variable in the CAS_TYP variable to provide the status of the cassette. Next, the control processor 306, in step 442, determines if a cassette tape is in the deck. If not, the control processor 306, in step 446, transmits a no tape ("NOTAPE") message to the interface processor 304 to be displayed by the front panel and then proceeds to step 564. If a tape is in the deck, the control processor 306, in step 448, readies the tape for operation by properly tensioning the tape and transmits a control processor 306 status ("System Status") response to the interface processor 304 for display on the front panel. The control processor 306 then proceeds to step 450.

In step 450, the control processor 306 determines if the deck is in a "record" mode. If the deck is not in a record mode, the control processor 306 proceeds to step 484; otherwise, the control processor 306, in step 452, checks the input to determine if any errors have resulted from the digital input, i.e., whether a DIG_IN error flag is set. If the digital input is in error, the control processor 306, in step 454, clears the "DIG_IN" error flag and then transmits, in step 456, a digital error ("dierr") message to the interface processor, which displays the message on the front panel that the source input is not a digital source. Afterwards, the control processor 306 proceeds to steps 458 where the control processor 306 instructs the deck 110 to enter a "stop" mode ("stopmode") and to abort the record mode (step 460). The control processor 306 then proceeds to step 564.

If the digital input is not in error (step 452), the control processor 306 determines, in step 462, if the digital input has violated the serial copyright management system (SCMS), as indicated by a "SCMS_DET" flag being set, which system is intended to prohibit the copying of second generation tapes. If the SCMS requirements have not been violated, the control processor 306 proceeds to step 464. If the SCMS has been violated, the control processor 306, in step 466, sets the SCMS_DET flag. Next, the control processor 306, in step 468, clears the CD input flags CD_SCMS and CD SCMS2 before transmitting a "COPY-PROHIBITED" NAK to the interface processor 304, which, in turn, displays on the front panel that the input source is "COPY-PROHIBITED" (step 470). Afterwards, the control processor 306 proceeds to step 458 where the control processor 306 instructs the deck to enter the stop mode and to abort the record mode (step 460). The control processor 306 then proceeds to step 564.

If there is no copyright protection errors found in step 462, the control processor 306, in step 464, determines if the "ID_DET" flag is set from the input source, indicating that a track change has occurred. If yes, the control processor 306, in step 472, increments the track index to the next successive track number and then records a "Start Marker" in the auxiliary track before proceeding to step 564. If, in step 464, there is no input source detected, the control processor 306, in step 478, checks the Input Select switch 212 to determine if has been set high. If so, the control processor 306, in step 480, sets an "ADSEL" flag of an "ADSEL_IN" variable, indicating that the system will record from the analog input source. If not, the control processor 306, in step 482, clears the ADSEL flag of the ADSEL_IN variable. After adjusting the ADSEL_IN variable, indicating to the system which input the recording will be recorded from, in either step 480 or step 482, the control processor 306 proceeds to step 484.

In step 484, the control processor 306 determines whether an ERR flag is set, indicating that the NAK from the control processor 306 has not been acknowledged by the interface processor 304. If the ERR flag is not set, the control processor 306, in step 486, determines if a tape command ("TAP_COMD") has been stored by the "ddspint" routine, due to a marker detected in the auxiliary data track. If a tape command has been detected in the auxiliary data, the control processor 306, in step 488, determines if a message request ("MESG_REQ") flag has been set, in response to the interface processor 304 requesting the track and time information for display. If the MESG_REQ flag has been set, or if there is no tape command stored in the auxiliary data track or the ERR flag has been set, the control processor 306 proceeds to step 500. If, in step 488, the MESG_REQ flag has not been set, the control processor 306 clears the TAP_COMD variable and resets a status count ("STAT_CT") variable to correspond to a one second timer interval (step 490). The control processor 306, in step 492, determines what was stored in the TAP_COMD variable. If TAP_COMD is equal to HOME_MRK, the control processor 306, in step 494, instructs the deck 110 to search for the home position on the tape before proceeding to step 564. Otherwise, the control processor 306 proceeds to step 496.

In step 496, the control processor 306 searches for a command and uses the command to index into the table of contents: index=[command×(0Fh)]×3. Afterwards, the control processor 306, in step 498, enters the mode pointed to by the index. Once the control processor 306 has proceeded to the indexed mode, the control processor 306 proceeds to step 564.

In step 500, the control processor 306 determines if "NMODE" contains a command from the interface processor. If not, the control processor 306 proceeds to step 564. If yes, the control processor 306, in step 502, determines if the new command is the same as the last command. If the new command is the same as the last command, the control processor 306, in step 504, determines if that command is a "PLAY" command. If the command is a PLAY command, or if, in step 502, the new command was not the same as the last command, the control processor 306 proceeds to step 506. If in step 504, the new command is not a PLAY command, the control processor 306, in step 508, sends a NAK to the interface processor, indicating that the last command received was an "invalid command". The control processor 306 then proceeds to step 564.

In step 506, the control processor 306 checks if the command received is an acknowledgment ("ACK") by the interface processor to a NAK previously sent by the control processor 306. If the command is an ACK, the control processor 306 proceeds to step 524. If the command is not an ACK, the control processor 306 in step 509, determines if the tape is in the deck by checking the "CAS_DET" flag. If there is no tape in the deck, the control processor 306 prompts the interface processor, using a NOTAPE NAK, to display the message "NO TAPE" before proceeding to step 564. If there is a tape in the deck, the control processor 306, in step 512, again determines if the command is PLAY. If the command is PLAY, the control processor 306, in step 514, determines if the current mode is fast forward or rewind. If the current mode is either fast forward or rewind, the control processor 306 returns to step 496. If the current mode is not in the fast forward or rewind mode, the control processor 306 proceeds to step 564.

If, in step 512, the command is not PLAY, the control processor 306, in step 516, determines if the previous command was "TIM INFO," and if so, proceeds to step 538. If the previous command was not "TIM_INFO" the control processor 306, in step 518, determines if the previous command was "ID_OPS," and if so, proceeds to step 550. If the previous command was not "ID_OPS," the control processor 306, in step 520, determines if a "System Status" request has been sent, and if so, proceeds to step 564. If a "System Status" request has not been sent, the control processor 306, in step 522, determines if any NAKs ("ERR" flag set) are currently being sent. If so, the control processor 306 proceeds to step 564, otherwise the control processor 306 returns to step 496.

If, in step 506, the command is an "ACK", the control processor 306, in step 524, clears the "TM-MOD" and the "IDOPS_MD" flags. Next, the control processor 306, in step 526, determines if a "System Status" request is being sent ("SYSREQ" flag set), and if so, in step 528, the control processor 306 clears the System Status request ("SYSREQ") flag before proceeding to step 564. If the control processor 306 is not sending any System Status requests, the control processor 306, in step 530, determines what NAK is being sent. If the NAK being sent is either a "SKIP_ID" or "REV_ID", the control processor 306, in step 532, determines if it is in the renumber mode, and if not, sends a "NO_ID" message to the interface processor to clear the ID icon on the display (step 534). After clearing the display, the control processor 306 proceeds to step 564. If, in step 530, other NAKs are being sent, the control processor 306 clears the "ERR" flag in step 536 before proceeding to step 564.

If in step 516, the previous command was "TIM_INFO" the control processor 306, in step 538, clears the "TM_MOD" flag before getting the next command in step 540. Once the next command is obtained, the control processor 306, in step 542, determines if the upper nibble of the command is equal to 0Ah and if not, proceeds to step 544, where the control processor 06 sends the interface processor an "invalid command" NAK before proceeding to step 564. If the upper nibble of the command is equal to 0Ah, the control processor 306, in step 546, sets up an index equal to the lower nibble of the command. If index is not less than 4, the control processor 306 proceeds to step 544. If the index is less than four, the control processor 306 proceeds to step 548. In step 548, the control processor 306 converts the index times three to a pointer into the time select table ("timesel"), which points to the routine that the control processor 306 should perform, based upon the command received.

If, in step 518, the previous command was "ID—OPS" the control processor 306, in step 550, clears the "IDOPS—MD" flag and then proceeds to get the next command (step 552). Once the next command is obtained, the control processor 306, in step 554, determines if the upper nibble of the command is equal to 5 and if not, proceeds to step 544, where the control processor 306 sends the interface processor 304 an "invalid command" NAK before proceeding to step 564. If the upper nibble of the command is equal to 5, the control processor 306, in step 560, sets the index equal to the lower nibble of the command. The control processor 306 proceeds to step 562. In step 562, the control processor 306 converts the index times three to a pointer to an ID select table ("idsel"), which pointer points to the routine that the control processor 306 should perform, based upon the command received.

At this stage, the control processor 306 returns to the main routine at "modecont", which begins, in step 564, to determine whether the current mode ("CMODE") is either Play or Record. If it is Play or Record, the control processor 306, in step 566, checks if the leader on the tape is present and if no leader is detected, the control processor 306, in step 568, sets the leader reverse ("LDR—REV") flag to 1 before proceeding to step 580. If the leader has been detected, the control processor 306, in step 570, determines if the LDR—REV flag is set to 1 and if so, proceeds to step 572, where the control processor 306 sets the LDR—REV flag to zero and the TAP—PROB variable equal to end of tape ("EOT") before proceeding to step 580. If the leader reverse flag is not set to zero, the control processor 306, in step 574, determines if the tape inserted into the deck is a digital compact cassette (DCC) and if not proceeds to step 590. If the tape is a DCC tape, the control processor 306, in step 576, checks the current mode to see if it is in record. If so, the control processor 306 advances to step 590. If the current mode is not in record, the control processor 306 in step 578, searches for the end of the leader of the tape, before proceeding to step 580.

In step 580, the control processor 306 determines if the current mode is set to Play and if not, the control processor 306 proceeds to step 590. If the current mode is set to Play, the control processor 306, in step 582, determines if the "lead-in—A" marker has been detected. If the lead-in—A marker has not been detected, the control processor 306, in step 584, determines if the "lead-in B" marker has been detected and if not the control processor 306 proceeds to step 590. If either the lead-in—A marker or the lead-in B marker has been detected the control processor 306, in step 586, searches forward to the end of the lead-in marker. Next, the control processor 306, in step 588, clears a "LAB ID" flag set by the ddspint routine to indicate that a label was detected on the tape and then proceeds to step 590.

In step 590, the control processor 306 checks if the tape has stopped and if so, it sets the "TAP—PROB" variable equal to EOT. Next, the control processor 306 enters into a tape sensing routine in step 592, which will return a result in the TAP—PROB variable. Upon completion of the tape sensing routine, the control processor 306 will check the TAP PROB variable to determine if the tape is new or a virgin tape, if the tape is at the end of tape position, or if it is clear. If the tape problem flag is set at virgin, the control processor 306, in step 594, sends a message to the interface processor to display "virgin tape." At this point, the control processor 306 will command the deck 110 to enter a Stop mode. If the tape problem flag is set to EOT, the control processor 306, in step 596, checks to determine if the current mode is Play.

If the current mode is Play, the control processor 306, in step 598, then changes directions before checking the auto reverse variable in step 600. If the auto reverse variable is set to continuous or full tape mode, when the playcount ("playct") variable is checked to determine if it is equal to zero (step 602) and if not, the control processor 306 decrements the playct variable, sends a change direction NAK to the interface processor 304 (step 604), and then proceeds to step 606.

If playct is equal to zero (step 602), the control processor 306 will proceed to step 620. In step 606, the control processor 306 determines if the current mode is Record and if so, the control processor 306, in step 608, performs a quick reverse and continues recording and then returns to the beginning of the main routine at step 402. If the current mode is not Record, the control processor 306 begins playing the reverse side of the tape in the deck 110 (step 610).

If, in step 596, the current mode is not Play, the control processor 306, in step 612, checks the current mode to determine if the current mode is Record. If the current mode is Record, the control processor 306, in step 614, determines if the sector is sector A or sector B. If the sector is sector A, the control processor 306 proceeds to execute steps 598–610. If the sector is sector B, the control processor 306, in step 616, clears the leader reverse flag ("LDR—REV") and then sets up to stop the recording in step 618. At that time, the control processor 306 then sends an end of tape NAK to the interface processor (step 620). Likewise, if the current mode is not record in step 612 or is Record in step 576, the control processor 306 proceeds and executes step 620. After sending the end of tape NAK to the interface processor, the control processor 306, in step 622, again checks to see if the current mode is record and if it is not it stops operation. If the current mode is record, the control processor 306, in step 624, determines whether the deck 110 is recording on sector A or sector B. If the deck is recording on sector A, the control processor 306 causes the deck 110 to enter record-pause mode; if on sector B, the control processor 306 stops the deck 110.

FIGS. 5a and 5c illustrate the timer interrupt routine as well as the DDSP interrupt ("ddspint") routine. It should be noted that because this routine is a dual purpose interrupt routine, upon entering the routine, an "Input Compare" register flag must be checked to determine if a start segment ("STRTSEG") pulse initiated the interrupt or if the 10 ms timer initiated the interrupt. The STRTSEG pulse occurs every 42.8 ms, indicating that the DDSP module 308 is available for a data transfer. First, in step 50a, the control processor 306 determines if a STRTSEG interrupt has been set up. If the STRTSEG interrupt has been set up, the control processor 306, in step 50b, determines if a STRTSEG pulse has been received by the Input Compare register. If the STRTSEG pulse has been received by the Input Compare register, the control processor 306, in step 50c, clears the Input Compare flag and then sets the "DDSP_DET" flag and the STRTSEG flag before returning to main routine from the timer interrupt routine (step 54e). If, in step 50a, a STRTSEG interrupt has not occurred, or in step 50b, the STRTSEG pulse has not been received by the Input Compare register, the control processor 306, in step 50d, reloads the 10 ms interrupt timer, which is done by adding 10 ms of counts to the alternate control register (Alt cntr reg). Next, the control processor 306, in step 50e, toggles a timer last ("TMRLAST") flag and the TCMP output pin, which is used for multiplexing inputs to the control processor 306, and then proceeds to step 50f. The control processor 306, in step 50f, then determines if the current mode is the diagnostics mode, which is used for production testing of the control processor 306, and if so, it proceeds to return from the interrupt at the end of the routine (step 54e). If the current mode is not the diagnostics mode, the control processor 306, in step 50g, determines if the message zero ("MSG_ZERO") flag has been set. If the message zero flag has not been set or if the message zero flag has been set but in step 50h, the "SCTXDAT" variable is not equal to zero, the control processor 306, in step 50i, clears the MSG_ZERO flag. Once the MSG_ZERO flag has been cleared, the control processor 306 calls a serial communications interface (SCI) transmit sub-routine.

The SCI transmit sub-routine begins, in step 50j, by Transmitting the value stored in the SCTXDAT variable. An "STAT_CT" variable is reset to 100 in step 50k, in order to delay the next status of the control processor 306 to be sent out by one second after receiving a command from the interface processor. Once the one second status counter has been reset, or the "STAT-CT" counter reaches zero in step 50h, the control processor 306, in step 50m, increments the "TICKS" variable for the delay routines, including the sense counter ("SENSCT") for the opto-sense detection. Afterwards, the control processor 306, in step 50n, determines if the control processor 306 is in a sync-up mode with the interface processor, which typically occurs only on power up and reset. If yes, the control processor 306 proceeds to step 52c. If the control processor 306 is not in a sync-up mode, the control processor 306, in step 50o, determines if the DDSP has been installed. If the DDSP has been installed the control processor 306 increments the "STSEG_CNT" (start segment counter) by one count (step 50p), where each count is equal to 10 ms of time. After incrementing the start segment counter, the control processor 306, in step 50q, determines if 200 ms have passed without a DDSP ("STRTSEG") interrupt request.

If 200 ms have passed since the last DDSP STRTSEG interrupt, the control processor 306, in step 50r, clears the start segment counter and the DDSP_DET flag. After clearing the counter and the flag, the control processor 306, in step 50s, resets the DDSP and the analog to digital and the digital to analog circuits.

If the DDSP (step 50o) has not been installed, or if less than 200 ms have passed since the last DDSP interrupt, or the DDSP and the A/D and D/A converters have been reset, the control processor 306, in step 50t, checks to see if any commands have been received from the interface processor. If a command has been received from the interface processor, the control processor 306, in step 50u, stores the command in the NMODE buffer. Once the command is stored in the NMODE buffer, or if no command has been sent from the interface processor, the control processor 306 decrements the one second status counter ("STAT_CT") in step 50v.

After the status counter has been decremented, the control processor 306 determines if the status counter has reached zero, i.e., if one second has elapsed (step 50w). If the status counter has not yet reached zero, the control processor 306 proceeds to step 52c. Once the status counter has reached zero, the control processor 306 resets the one second status counter (step 50x). Next, the control processor 306 determines if the ERR flag has been set (step 50y), and if so, the control processor 306 proceeds to step 52p. If the ERR flag has not been set, the control processor 306 determines if the MESG_REQ flag is set (step 50z). If the message request flag has not been set, the control processor 306, in step 52a, determines if the control processor 306 is sending a System Status request. If the message request flag (step 50z) is set, or if the control processor 306 is not sending a System Status request, the control processor 306 proceeds to step 52w. If the control processor 306 has sent a System Status request, the system, in step 52b, clears the NAK counter ("NAK_CNT") and loads the System Status and stores it in the SCTXDAT variable (step 54a). Once the SCTXDAT variable has been loaded, the control processor 306 calls the scitx routine to transmit the SCTXDAT variable and then proceeds to step 52c.

If the status counter has not reached zero (step 50w), the control processor 306 proceeds to step 52c. In step 52c, the control processor 306 determines if the TMRLAST flag has been set to zero or one. In this manner, the I/O can be multiplexed so that twice as many inputs can be read, where each set of I/O is read on every other 10 ms interrupt, where the TCMP pin is toggled to read the cassette status switches on the positive half cycle and the tape status switches on the negative half cycle. If the TMRLAST flag is zero, the system counter, in step 52d, reads the tape status switches at the I/O port. Next, the control processor 306, in step 52e, determines if the tape status is equal to what was last stored in the "tape final" (TAP_FNL) variable, i.e., the tape has been debounced, and if so the control processor 306 exits the sub-routine and returns to the main routine. If the tape final status has not been reached, the control processor 306 determines if the tape status is equal to the tape temporary (TAP_TEMP) variable (step 52f). If the tape status is not equal to the TAP_TEMP variable, the command is stored in the tape temp variable (step 52g). If the tape status is equal to what was last stored in TAP_TEMP, the control processor 306, in step 52g, stores the tape status in the tape final variable. After either the tape final or the tape temp variable has been updated, the control processor 306 exits the sub routine and returns to the main routine.

Returning to 52c if the TMRLAST flag has been set to one, the control processor 306, in step 52i, reads the cassette status switches. Once the cassette status has been read, the control processor 306 determines if the cassette status is equal to CAS_FNL, i.e., the cassette has been debounced, (step 52j) and if so, the control processor 306 exits the sub-routine and returns to the main routine. If the cassette status is not equal to CAS_FNL, the control processor 306, in step 52k, determines if the cassette status is equal to a "cassette temp" (CAS_TEMP) level. If the cassette status is not equal to cassette temp, the control processor 306, in step 52l, stores the cassette status in a cassette temp variable and clears the bounce count variable (BCT1). Afterwards, the control processor 306 exits the sub-routine and returns to the main routine.

If the cassette status is the same as that in the cassette temp variable (step 52k), the control processor 306, in step 52m, determines if the debounce timer has reached DEBOUNCE. If BNCT1 is at DEBOUNCE, the cassette status is stored in the cassette final variable (step 52n) and the control processor 306 exits the sub-routine and returns to the main routine. If BNCT1 is not equal to the DEBOUNCE constant, BCNT1 is incremented (step 52o) before exiting the sub-routine and returning to the main routine.

If the ERR flag (step 50y) has been set, the control processor 306 proceeds to step 52p. In step 52p, the control processor 306 checks to determine if the NAK sent was the first NAK, i.e., whether the NAK counter is equal to zero. If the NAK counter is not zero, the control processor 306, in step 52f, determines if the NAK counter is equal to 8. If the NAK counter is equal to 8, the control processor 306, in step 52r clears the MESG_REQ flag and resets the NAK counter to zero. This is dictated by system requirements that a maximum of 8 NAKs can be sent in a row, to keep the control processor 306 from becoming hung-up in an error mode. Afterwards, the control processor 306, in step 52s, determines if an ID Detect (ID_DET) flag has been set. If the ID-DET has been set, the control processor 306 has incurred an ID on the tape and is sending an ID NAK (i.e., a start, skip or reverse ID) to the interface processor to display the ID. The control processor 306 determines if the NAK is equal to NO_ID (step 52t), indicating that the ID is complete. The NO_ID NAK prompts the interface processor to clear any ID from the display. If the NAK is not equal to NO ID, the control processor 306, in step 52u) clears all error flags except the ID_DET flag. If the ID_DET flag has not been set, or if the NAK is NO_ID, the control processor 306, in step 52v, clears any serial communications erros stored in a SCIERR variable. Once the SCIERR variable has been cleared or all other ERR flags except the ID_DET flag have been cleared, the control processor 306 proceeds to step 52w, where the current status is loaded into the SCTXDAT variable.

If the NAK counter has been determined to be equal to zero, the control processor 306, in step 52x, determines if the NAK variable is equal to NO_ID and if so, the control processor 306, in step 52y, loads the current status. Once the current status has been loaded, the control processor 306, calls the scitx routine to transmit the current status.

After step 52y, it loads the NAK variable (step 52z) and then stores it in SCTXDAT (step 54a) and then calls scitx routine and returns to step 52c. In this manner Current Status is always transmitted prior to the first NAK being transmitted to the interface processor. If the NAK is not equal to NO_ID (step 52x), or if the NAK counter is not equal to 8, the control processor 306, in step 52z, loads the NAK variable and proceeds to step 54a.

If the message request flag has been set (step 50z), or if the control processor 306 is sending a System Status request (step 52a), the control processor 306, in step 52w, loads the Current Status as previously described above. Once either a NAK, the Current Status or the System Status (step 52b) has been loaded, that variable is stored in the SCTXDAT variable (step 54a). Once the SCTXDAT has been stored, the control processor 306 calls scitx routine to transmit the variable. The control processor 306 continues through step 52c–52o before returning to the main routine.

Figure 4A:
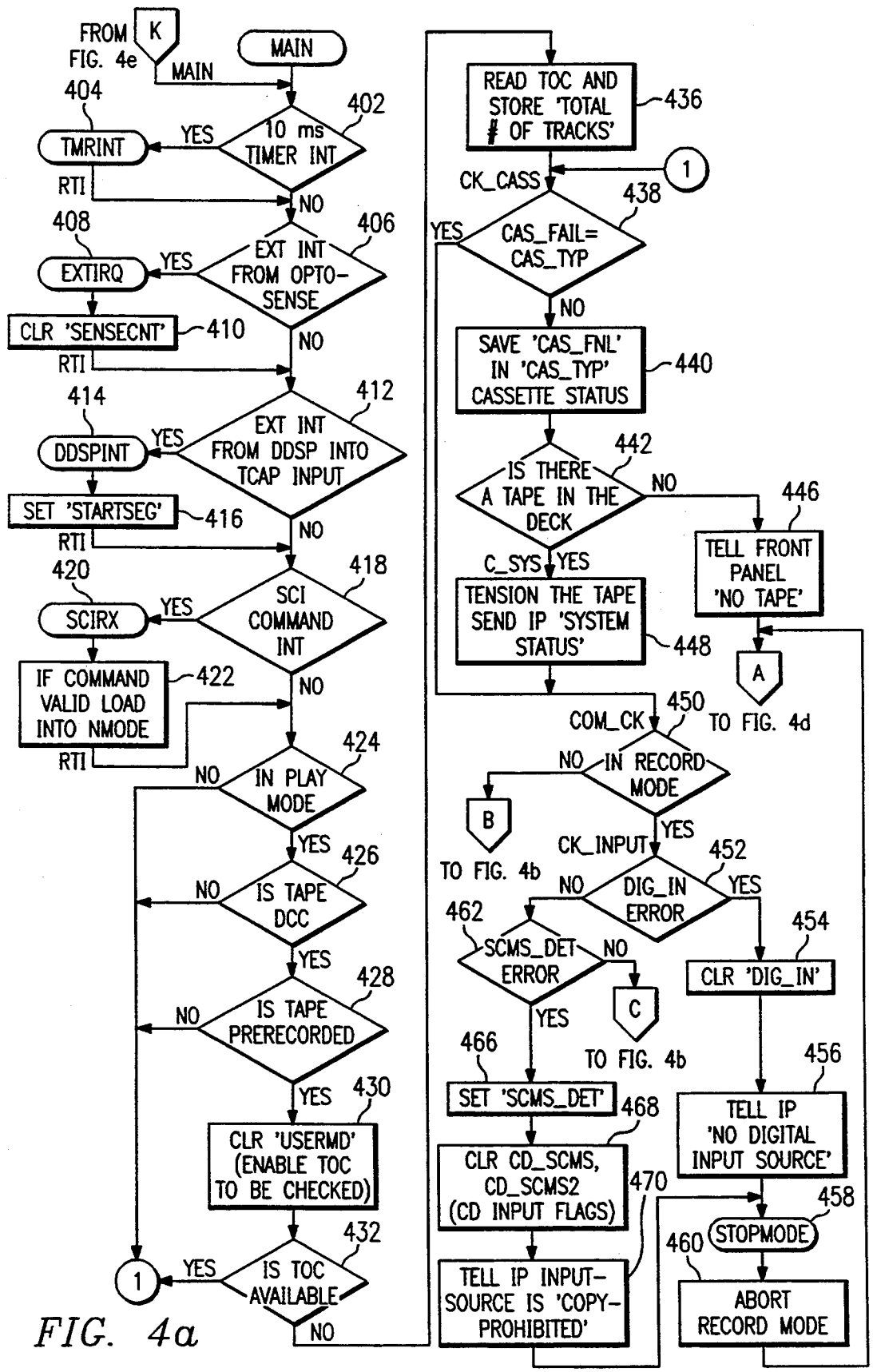
Figure 4B:
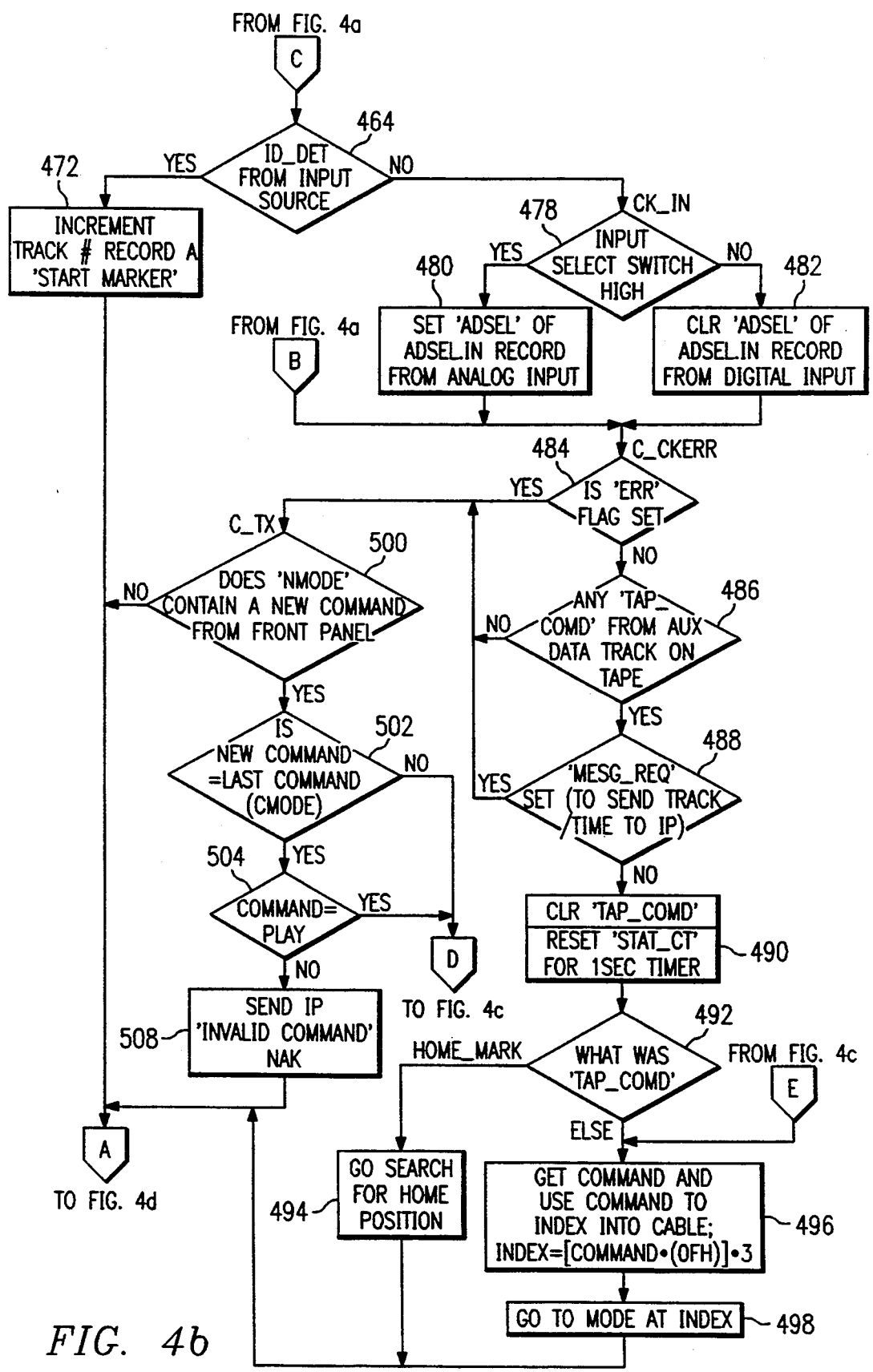
Figure 4C:
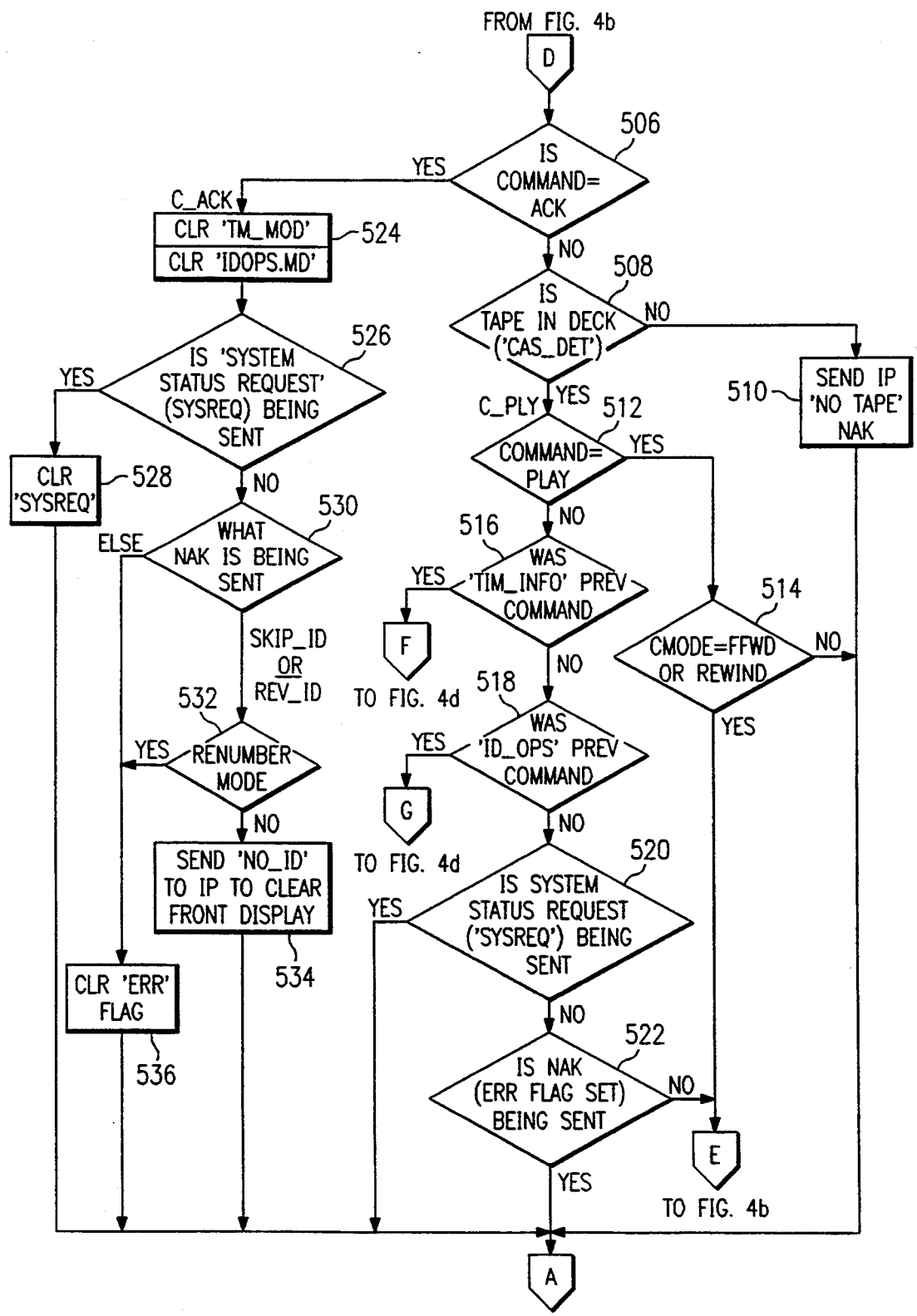
Figure 4D:
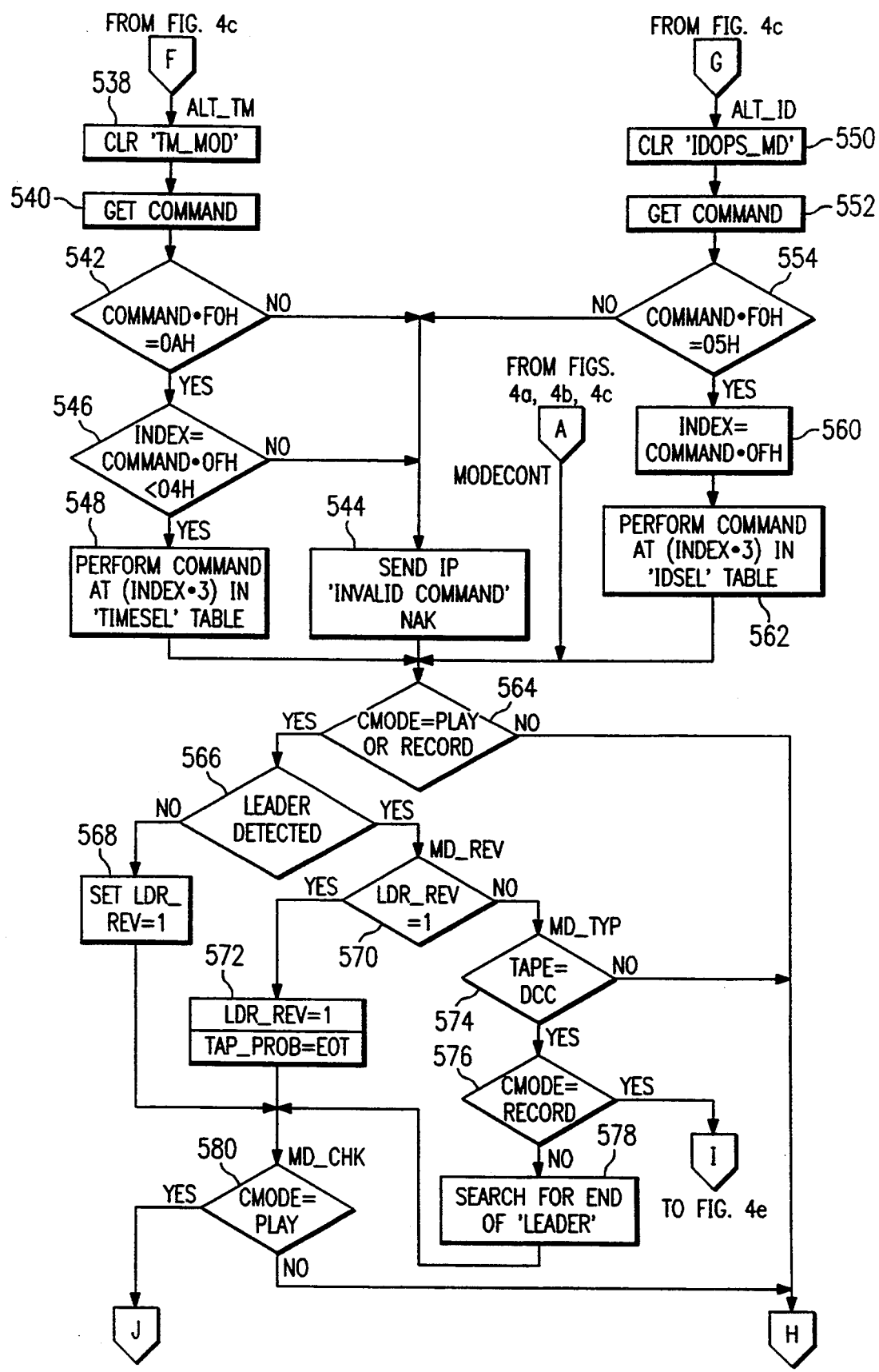
Figure 4E:
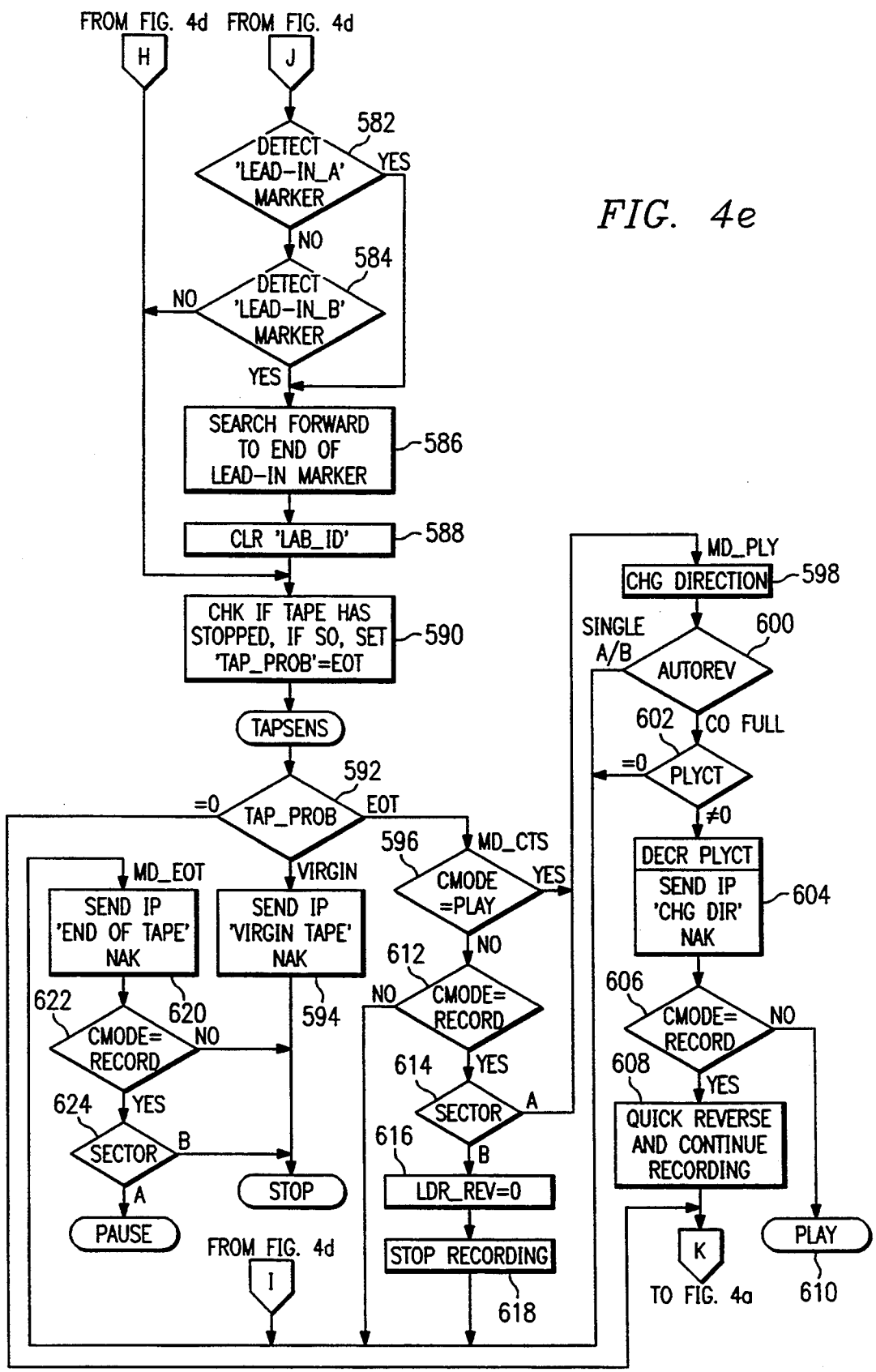
Figure 5A:
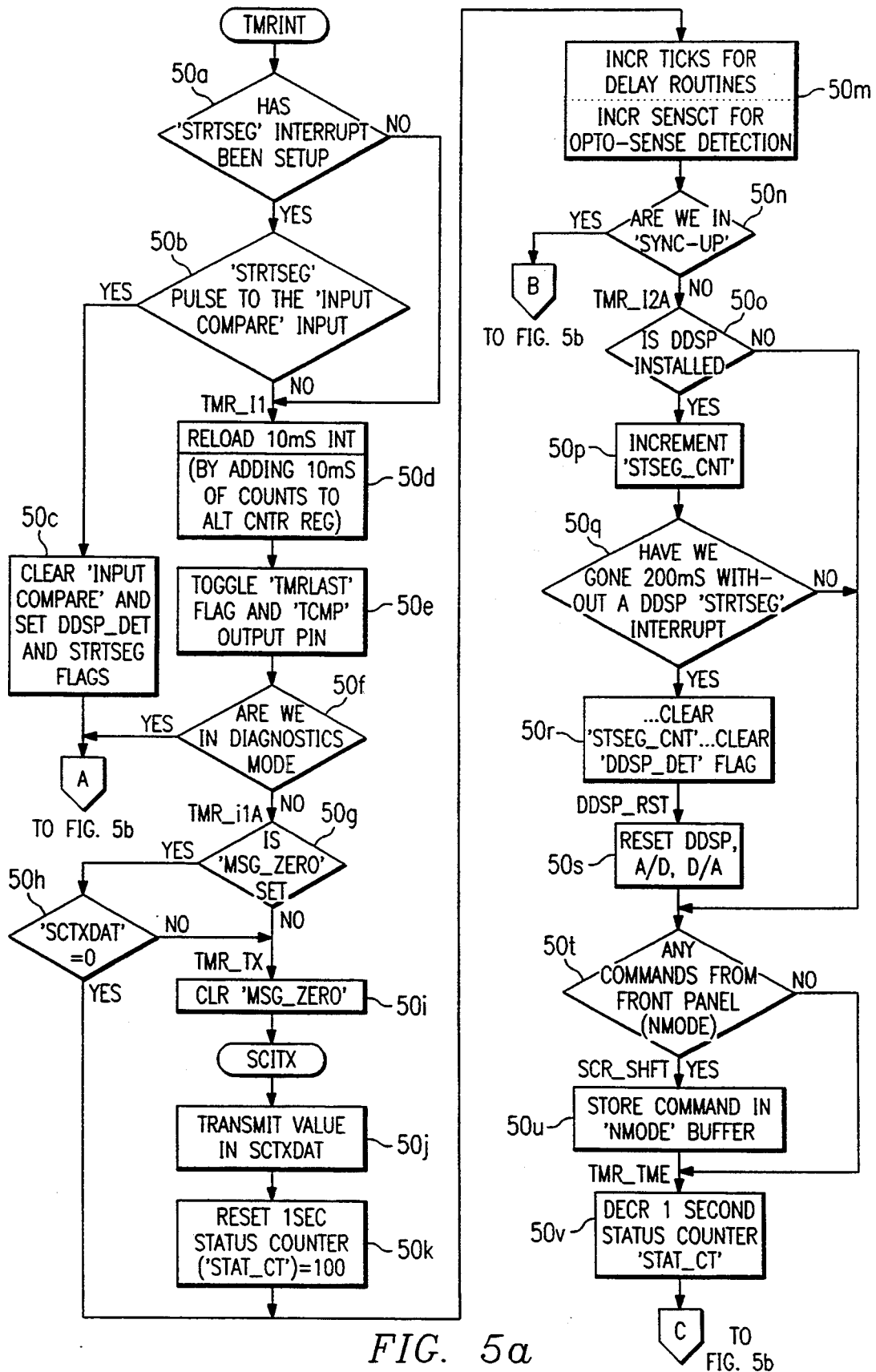
FIGS. 5a–5b comprise a flow chart illustrating in detail a 10 ms timer interrupt routine implemented by the control processor to sample the incoming data from a communications port and to sample I/O data to update status information to be output on the communications port.
Figure 5B:
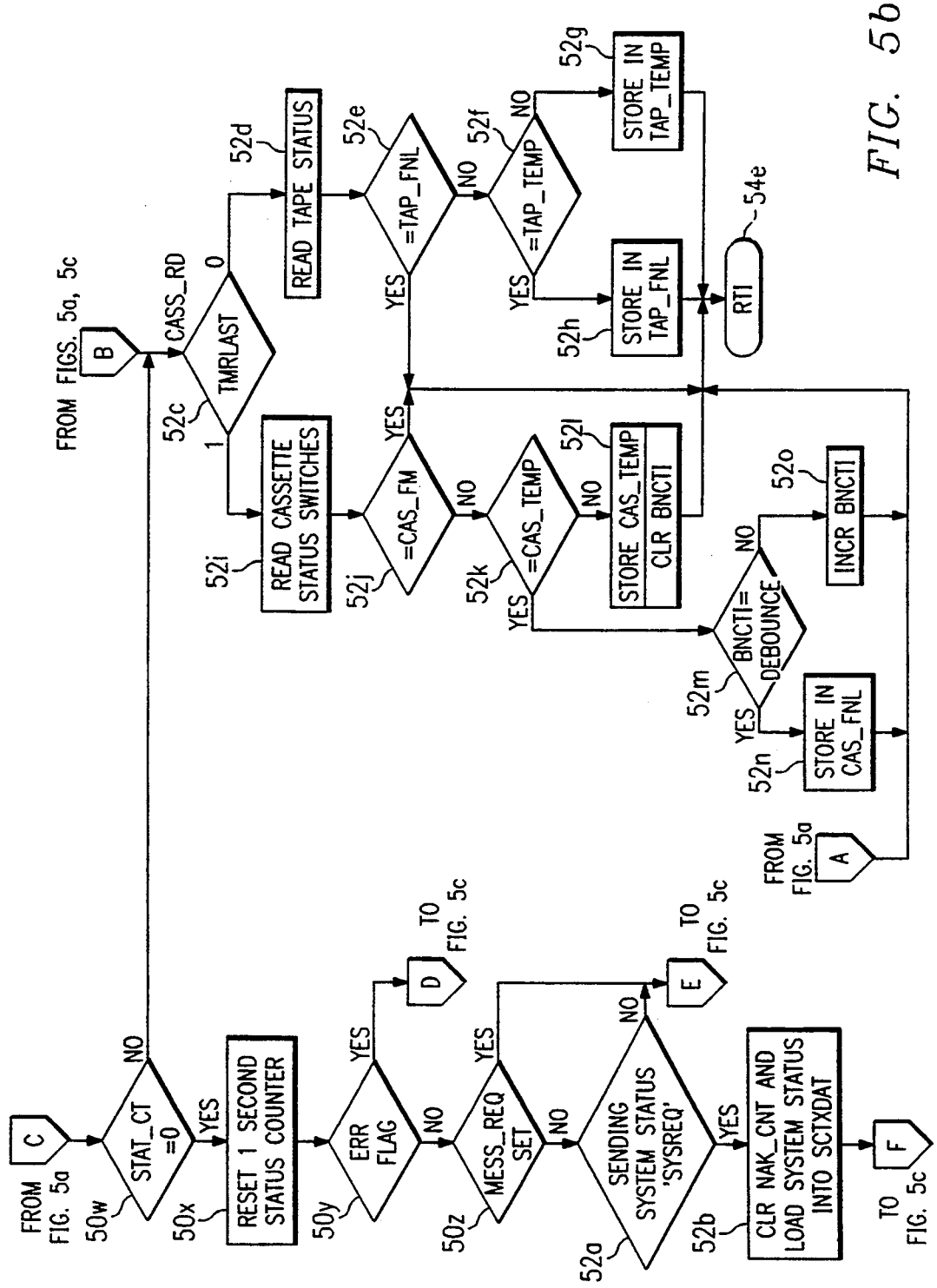
Figure 5C:
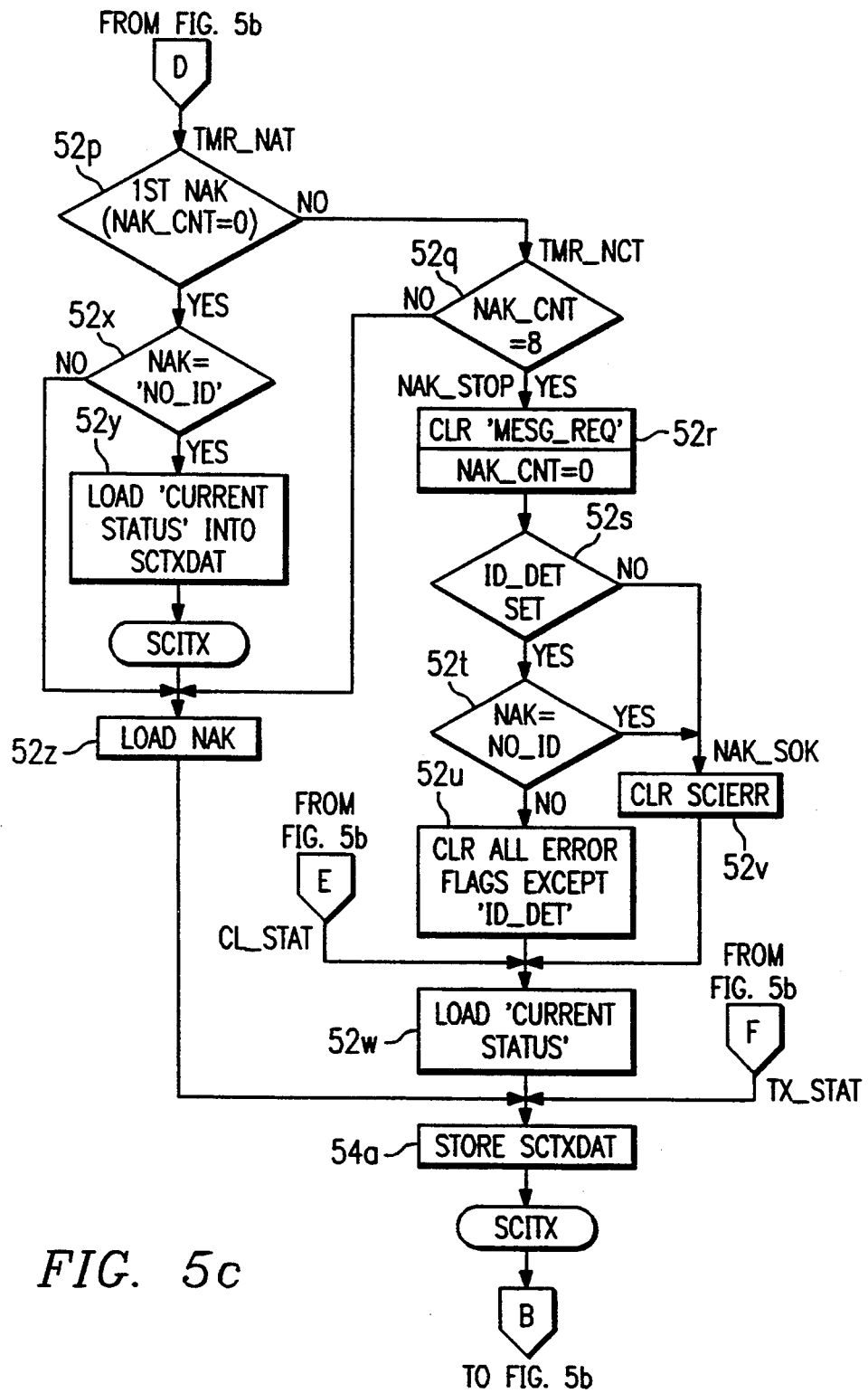
Figure 6:
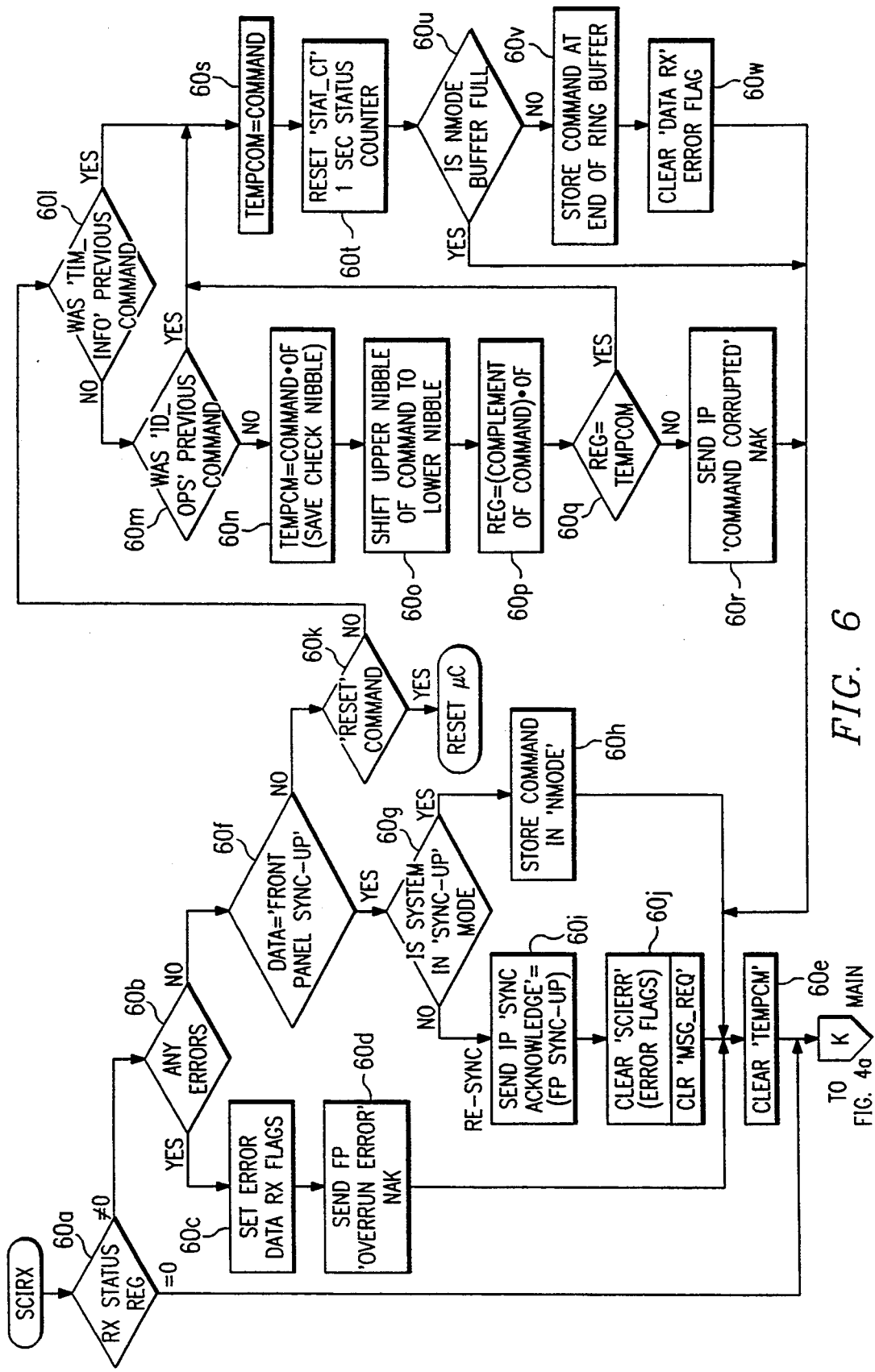
FIG. 6 is a flow chart illustrating a service communication routine implemented by the control processor to send, receive and process error correction information over the communications port.

FIG. 6 illustrates the scirx sub-routine of step 420 of FIG. 4a. In step 60a, the sub-routine checks the receiver status register to determine if it is equal to zero. If the status register is equal to zero, the control processor 306 returns to the main routine in FIG. 4a. If the status is not equal to zero, the control processor 306, in step 60b, determines if there are any errors. If an error is detected, the control processor 306, in step 60c, sets a data received error flag. Afterwards, the control processor 306, in step 60d, sends the interface processor an overrun error NAK. After transmitting the overrun error, the control processor 306 clears a temporary command variable (step 60e). After clearing the temporary command variable, the control processor 306 returns to the main routine.

If no errors are detected (step 60b), the control processor 306, in step 60f, determines if the data is equal to the "Front Panel Sync-Up" command, and if so, the control processor 306, in step 60g, determines if the control processor 306 is in a sync-up mode. If yes, the control processor 306, in step 60h, stores the command received in the new mode ("NMODE") variable before proceeding to step 60e. If the control processor is not in a sync-up mode, the control processor 306, in step 60i, attempts to synchronize the control processor 306 by sending the interface processor a "sync acknowledged" response. In step 60j, the control processor 306 clears the SCIERR error flags as well as clearing the MESG_REQ flag, if it has been set. Once both flags have been cleared, the control processor 306, then clears the TEMPCM variable (step 60e), before returning to the main program.

If, in step 60f, the data is not a Front Panel Sync-Up command, the control processor 306, in step 60k, determines if a "Reset" command has been received, and if so, it resets the control processor 306. If a RESET command has not been received, the control processor 306, in step 60l, determines if a "Time Information Request ("TIM_INFO") command was the previous command issued by the interface processor. If the previous command was not a TIM_INFO command, the control processor 306, in step 60m, determines if the previous command was an "ID Operation" ("ID_OPS") command. If this is not the case, the control processor 306, in step 60n, masks the check nibble of the command, and stores it in TEMPCM variable. Next, the complement of the upper command nibble of the command is stored in a temporary register (steps 60o and 60p). In step 60q, the control processor 306 checks to see if the temporary register is equal to the value stored in TEMPCM variable. If not, the control processor 306 proceeds to step 60r, where it sends the interface processor a "Command Corrupted" NAK response. Then the control processor 306 proceeds to step 60e to clear the TEMPCM variable before returning to the main routine.

If, in step 60l, the previous command was a TIM_INFO command, or in step 60m, the previous command was an ID_OPS command, or in step 60q, if the temporary register was not equal to TEMPCM, (i.e., the check nibble was not equal to the inverse of the command nibble) the control processor 306 proceeds to step 60s. In step 60s, the command received in step 60a is stored in the TEMPCM variable. Next, the control processor 306, in step 60t, resets the one second status counter (STAT-CT), so that the control processor 306 has one complete second to implement the command received and update the current status prior to sending it out to the interface processor. Next, the control processor 306 proceeds to step 60u. In step 60u, the control processor 306 determines if the NMODE receive buffer is full and if not, the control processor 306 proceeds to step 60v. In step 60v, the control processor 306 stores TEMPCM at the end of the NMODE ring buffer. Next, the control processor 306 clears the data receiver error error flag (step 60w) before proceeding to step 60e. If the NMODE buffer is full the routine then proceeds to step 60e, before returning to the main routine.

Although the invention has been described in terms of a selected preferred embodiment encompassing the apparatus and methods aspects of a interprocessor communications protocol, the invention should not be deemed limited thereto, since other embodiments and modifications will readily occur to one skilled in the art.

What is claimed is:

1. An electronic apparatus comprising:
   a master control logic means for controlling operation of a set of components;
   a second control logic means, coupled to the master control logic means, said second control logic means for receiving from a subset of the set of components user input requesting performance of particular operations and for controlling operation of the subset of the set of components; and,
   communications means, operating between the master control logic means and the second control logic means, for enabling the second control logic means to transmit to the master control logic means commands generated in response to user input, wherein each of the commands comprises a command byte including a command nibble and a check nibble, and for enabling the master control logic means to acknowledge receipt of valid commands sent from the second control logic means and to reject invalid commands;
   wherein the master control logic means causes the particular operations to be performed in accordance with said valid commands.

2. The apparatus of claim 1 wherein the communications means further comprises means for providing signals representing a mode of operation understood by the master control logic means and communicated to the second control logic means.

3. The apparatus of claim 1 wherein the communication means further comprises means for providing signals representing an error condition understood by the master control logic means and communicated to the second control logic means.

4. The apparatus of claim 1 further comprising means for exclusive ORing the command nibble of each command byte with the check nibble of the command byte, wherein when the result of the exclusive ORing is zero, the command byte is valid; otherwise, the command byte is invalid.

5. The apparatus of claim 1 wherein said master control logic means is a main control processor and said second control logic means is an interface processor.

6. The apparatus of claim 1 wherein the subset of the set of components comprises a keyboard matrix, a display and an analog/digital select switch.

7. The apparatus of claim 1 wherein the particular operations include stop, play reverse, fast forward, rewind and record operations.

8. A method of enabling communication between an interface processor for processing user input and a control processor for controlling operation of a plurality of devices in response to the user input, the method comprising:
   (a) respective to user input requesting a particular operation, the interface processing issuing to the control processor a command byte comprising a command nibble and a check nibble;
   (b) responsive to receipt of the command byte, the control processor checking the command byte for validity;
   (c) responsive to the command byte being valid, the control processor issuing a status signal to the interface processor and processing the command byte to perform the particular operation;
   (d) responsive to the command byte being invalid, the command processor issuing a no-acknowledge (NAK) signal to the interface processor;
   (e) responsive to receipt of the status signal, the interface processor checking the status signal to insure that the control processor is performing the particular operation; and
   (f) responsive to receipt of a NAK signal, the interface processor reissuing the command byte to the control processor.

9. The method of claim 8 further comprising:
   (g) repeating step (f) a predetermined number of times; and
   (h) responsive to step (f) being repeated a predetermined number of times, aborting the particular operation.

10. The method of claim 8 wherein the check nibble is a complement of the command nibble and wherein checking the command byte for validity comprises exclusive ORing the check nibble with the command nibble such that if the result is zero, the command byte is valid; otherwise, the command byte is invalid.

11. The method of claim 8 further comprising, responsive to an error in communications, resetting the control processor and the interface processor.

12. The method of claim 8 wherein the particular operation is a stop, play, reverse, fast forward, rewind or record operation.

* * * * *